US012677841B2

(12) United States Patent
Berkovits

(10) Patent No.: US 12,677,841 B2
(45) Date of Patent: Jul. 14, 2026

(54) SMOKE GENERATOR AND A SYSTEM FOR FEEDING SMOKE PARTICLES TO A SMOKE CABINET

(71) Applicant: Berkos Försäljning AB, Arlandastad (SE)

(72) Inventor: David Berkovits, Knivsta (SE)

(73) Assignee: Berkos Försäljning AB (SE)

( * ) Notice: Subject to any disclaimer, the term of this patent is extended or adjusted under 35 U.S.C. 154(b) by 132 days.

(21) Appl. No.: 18/252,388

(22) PCT Filed: Jan. 11, 2023

(86) PCT No.: PCT/SE2023/050030
§ 371 (c)(1),
(2) Date: May 10, 2023

(87) PCT Pub. No.: WO2023/136770
PCT Pub. Date: Jul. 20, 2023

(65) Prior Publication Data
US 2025/0072439 A1 Mar. 6, 2025

(30) Foreign Application Priority Data
Jan. 11, 2022 (SE) .................................... 2250016-9

(51) Int. Cl.
*A23B 4/052* (2006.01)
*F24C 15/32* (2006.01)
(52) U.S. Cl.
CPC .......... *A23B 4/0526* (2013.01); *F24C 15/327* (2013.01)

(58) Field of Classification Search
CPC ....... A23B 4/0526; A23B 4/044; A23B 4/052; A23B 2/721; A23B 2/7045; F24C 15/327; B08B 3/02; B08B 13/00; A23L 5/17
See application file for complete search history.

(56) References Cited

U.S. PATENT DOCUMENTS

| | | | | | |
|---|---|---|---|---|---|
| 5,609,095 | A | * | 3/1997 | Lemke ..................... | A47J 27/16 |
| | | | | | 99/468 |
| 5,910,330 | A | * | 6/1999 | Fessmann ............ | A23B 4/0526 |
| | | | | | 426/321 |

(Continued)

FOREIGN PATENT DOCUMENTS

| | | |
|---|---|---|
| DE | 10 2015 203810 A1 | 9/2016 |
| EP | 0 241 965 A | 10/1987 |

(Continued)

OTHER PUBLICATIONS

Office Action dated Dec. 23, 2025 for Japanese Application No. 2024-538658 and English translation.

(Continued)

*Primary Examiner* — Tiffany T Tran
(74) *Attorney, Agent, or Firm* — Chrisman Gallo Tochtrop LLC

(57) ABSTRACT

The present invention relates to a smoke generator comprising a housing with a condensate inlet for receiving a smoke condensate and a steam inlet for receiving overheated water steam, wherein the smoke condensate is converted to smoke particles when the smoke condensate interacts with the (Continued)

overheated water steam, and the smoke particles are accessible at a smoke outlet. The invention also relates to a system for feeding smoke particles to a smoke cabinet.

8 Claims, 1 Drawing Sheet

(56) References Cited

U.S. PATENT DOCUMENTS

| | | | |
|---|---|---|---|
| 2009/0136638 A1 | 5/2009 | Fujie et al. | |
| 2019/0024904 A1 * | 1/2019 | Ueda ....................... | F24C 13/00 |

FOREIGN PATENT DOCUMENTS

| | | | | |
|---|---|---|---|---|
| EP | 0241965 A1 * | 10/1987 | ........... | A23B 4/0526 |
| GB | 1283215 | 7/1972 | | |
| GB | 1 484 449 A | 9/1977 | | |
| JP | S46-000267 B | 1/1971 | | |
| JP | S4948511 B1 | 12/1974 | | |
| JP | 2013-046638 A | 3/2013 | | |

OTHER PUBLICATIONS

CA Examiner's Report Application 3,244,515 Apr. 17, 2025.
Japanese Office Action dated Sep. 11, 2025 for corresponding Japanese Application No. 2024-538658 and English translation.
Office Action dated Aug. 11, 2025 for corresponding Australian Application No. 2023207583.
International Search Report for corresponding International Application No. PCT/SE2023/050030 mailed Mar. 20, 2023.
Written Opinion for corresponding International Application No. PCT/SE2023/050030 dated Mar. 20, 2023.
Second Office Action dated Nov. 14, 2025 for Chilean Application No. 202402014 and English translation.
Extended European Search Report dated Feb. 11, 2026 for European Application No. 23740565.9.
Office Action dated Mar. 19, 2026 for Republic of Korea Application No. 10-2024-7026959 and English translation.
Expert Report (Office Action) dated Jul. 18, 2025 for corresponding Chilean Application No. 202402014 and machine translation.
Search Report dated Jul. 18, 2025 for corresponding Chilean Application No. 202402014 and machine translation.

* cited by examiner

SMOKE GENERATOR AND A SYSTEM FOR FEEDING SMOKE PARTICLES TO A SMOKE CABINET

CROSS-REFERENCE TO RELATED APPLICATIONS

This application is a national stage entry of International Application No. PCT/SE2023/050030 filed on Jan. 11, 2023, which claims the benefit of priority to Sweden Application No. 2250016-9, filed Jan. 11, 2022, the entire disclosures of which are hereby incorporated herein by reference.

TECHNICAL FIELD

The present disclosure relates to the field of smoking items in a smoke cabinet, and in particular to the field of generating smoke particles from smoke condensate.

BACKGROUND

Smoking is the process of flavoring, browning, cooking, or preserving food by exposing it to smoke from burning or smoldering material, most often wood.

Smoking can be done in four ways: cold smoking, warm smoking, hot smoking, and through the employment of "liquid smoke" also known as smoke condensate. Liquid smoke, which is a product derived from smoke compounds in water, is applied to foods through atomizing, drenching, spraying or dipping. However, it takes a rather long time to produce smoked foods using liquid smoke in conventional units, since the generated smoke particles are much larger and too big to be able to penetrate the products being exposed to this smoke. Thus, there is a need to improve the smoking process based on smoke condensate.

SUMMARY

An object of the present disclosure is to provide a smoke generator which generates smoke particles from liquid smoke which seeks to mitigate, alleviate, or eliminate one or more of the above-identified deficiencies in the art and disadvantages singly or in any combination and to provide a system for feeding smoke particles to a smoke cabinet. It is also an object of the invention to present a smoke generator design that enables generation of smoke particles having a small diameter, preferably smaller than 10 microm-eter.

This object is obtained by a smoke generator comprising a housing with a condensate inlet for receiving a smoke condensate and a steam inlet for receiving overheated water steam, wherein the smoke condensate is converted to smoke particles when the smoke condensate interacts with the overheated water steam, and the smoke particles are acces-sible at a smoke outlet.

An advantage with the smoke generator is that the size of the smoke particles is similar to natural smoke, e.g. smoke generated by burning wood, but the composition of the smoke contains fewer unhealthy substances, e.g. tar, than natural smoke. According to one embodiment, the over-heated water steam has a temperature of 120 degrees Cel-sius.

According to one embodiment, the smoke generator com-prises a nozzle attached to the condensate inlet configured to distribute the smoke condensate within the housing.

According to one embodiment, the nozzle is located between the steam inlet and the smoke outlet and the distance from the nozzle to the smoke outlet is at least 100 mm, preferably at least 200 mm, or even more preferred at least 400 mm. Clogging of condensate that has not been finely divided into smoke particles onto inner surfaces of the walls of the housing is thereby prevented.

According to one embodiment, the distance between the nozzle and the wall or walls of the housing surrounding the nozzle and extending between the steam inlet to the smoke outlet is at least 20 mm, preferably at least 50 mm, or even more preferred at least 100 mm. Clogging of condensate that has not been finely divided into smoke particles onto inner surfaces of the walls of the housing is thereby further prevented.

According to some embodiments, the housing has in inner width of 40-200 mm and an inner length, from steam inlet to smoke outlet, of 400-2000 mm. According to one embodi-ment, the geometry of the housing is cylindrical, wherein width is referred to as diameter.

According to one embodiment, the smoke generator is provided with a smoke condensate regulator regulating a flow rate of the smoke condensate through the condensate inlet into the housing of the smoke generator.

According to one embodiment, the flow rate is in the range of 0.1 to 20 liters/hour. In other words, the smoke condensate inlet and the smoke condensate regulator are configured to deliver condensate into the housing with a flow rate of 0.1 to 20 liters/hour.

According to one embodiment, the smoke generator is provided with a pressure regulator regulating a pressure of the overheated water steam entering through the steam inlet into the housing of the smoke generator.

According to one embodiment, the pressure is in the range of 0.2 to 1.2 bar. In other words, the steam inlet and the steam inlet and the pressure regulator are configured to deliver steam into the housing with a pressure of 0.2 to 1.2 bar.

According to one embodiment, the smoke generator is configured to generate a mixed steam and liquid (sum of condensate and steam) flow rate through the housing in the range of 25-300 kg/hour.

This object is also achieved by a system for feeding smoke particles to a smoke cabinet. The system comprises a smoke generator as defined above, a steam supply, a smoke condensate supply, a control unit and the smoke cabinet. The steam supply provides overheated water steam having a steam temperature, Ts, to the steam inlet of the smoke generator via a pressure regulator, the smoke condensate supply provides smoke condensate to the condensate inlet of the smoke generator via a condensate regulator, and smoke particles from the smoke outlet of the smoke generator is provided to an inlet of the smoke cabinet operating at a cabinet temperature, Tc. The control unit is configured to control the conversion of the smoke condensate to smoke particles based on the steam temperature, Ts, and the cabinet temperature, Tc.

An advantage with the system is that the time to smoke foods is reduced compared to prior art systems.

According to one embodiment, the system has a sensor to measure a steam temperature, Ts, and the smoke cabinet is configured to be operating at a cabinet temperature, Tc, wherein the system further comprises a control unit config-ured to control the conversion of the smoke condensate to smoke particles based on the steam temperature, Ts, and the cabinet temperature, Tc.

According to one embodiment, the control unit is further configured to control the condensate regulator to regulate the flow rate of the smoke condensate and/or the pressure regulator to regulate the pressure of the overheated water steam to control the conversion of the smoke condensate to smoke particles, preferably such that the size of the smoke particles generated by the smoke generator is smaller than 10 micrometer.

According to one embodiment, the system is configured to generate a mixed steam and liquid (sum of condensate and steam) flow rate through the housing in the range of 25-300 kg/hour.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
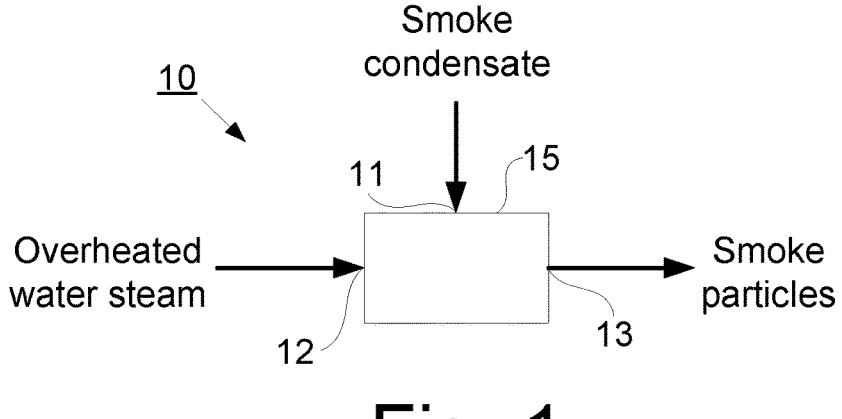
FIG. 1 is a schematic illustration of a smoke generator.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards a smoke generating device and a system for feeding smoke particles to a smoke cabinet for smoking foods. The system of this disclosure regenerates the liquid smoke into natural sized smoke particles as the generated smoke into natural sized smoke particles as the generated particles in the process converts it back into a natural state with smaller particles than in conventional systems using liquid smoke where the smoke particles are approximately 100 micrometers. Thus, the size of the smoke particles generated by the smoke generator described in this disclosure is smaller than 10 micrometer, and in some examples the smoke particles are not even visible by the naked eye, i.e. the size of the particles is less than 7 micrometers. The size of the generated smoke particles may be compared to the size of particles in natural smoke, which means that the smoke condensate may be converted to naturally sized smoke particles in the smoke generator.

Smoke is often used to provide food products with aroma and colour in addition to the taste of smoke. Traditionally, liquid smoke, also known as some condensate, has been sprayed onto food products in the smoke cabinet to coat the surface of the food products. However, the result of applying smoke condensate on the food products is uneven colouring, slow process and a less pleasant taste of smoke.

The object of the present invention is to use smoke condensate and convert it into smoke particles in a smoke generator before it is introduced into the smoke cabinet for smoking the food products, and the size of the generated smoke particles may be naturally sized smoke particles. The smoke generator will ensure that the colouring of the food products is more even, the smoking process is faster compared to spraying and a more natural, and thus more pleasant, smoky taste is achieved.

FIG. 1 shows a schematic illustration of a smoke generator 10 comprising a housing 15 with two inlets 11, 12 and a smoke outlet 13. A first inlet, also known as a condensate inlet 11, is configured to receive smoke condensate. In order to reduce the effect of unhealthy substances that normally are present in the smoke condensate, a condensate tank may be provided where the heavy particles, such as tar, are separated and fall to the bottom of the condensate tank.

The portion of the smoke condensate that remains closer to the surface of the condensate tank is introduced into the smoke generator 10 and thus contains less unhealthy substances than the original smoke condensate.

A second inlet, also known as steam inlet 12, is configured to receive overheated water steam, i.e. water steam having a steam temperature, $T_s$, of more than 100 degrees Celsius, $T_s > 100°$ C. It has been found that it is preferred that the steam temperature should be in the range of 100-140° C., more preferably 110-130° C., and even more preferably 120° C. The overheated water steam may pass via a steam trap to reduce the humidity of the water steam before it is introduced into the smoke generator 10.

The smoke condensate is converted to smoke particles when the smoke condensate interacts with the overheated water steam, and the smoke particles are thereafter accessible at the smoke outlet 13. It should be noted that the conversion of the smoke condensate to smoke particles occurs when the smoke condensate interacts with the overheated water steam irrespectively of the implementation of the inlets. I.e. any type of opening (with or without a nozzle) may be used when introducing the smoke condensate, or the overheated water steam, into the smoke generator 10.

Figure 2:
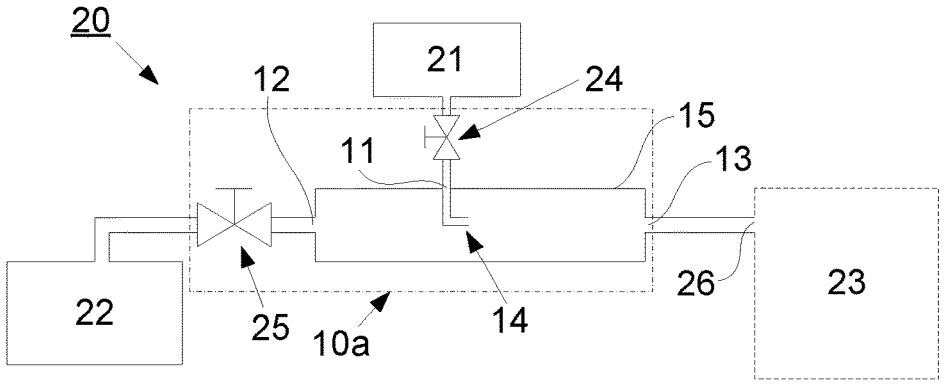
FIG. 2 illustrates a first embodiment of a system for feeding smoke particles to a smoke cabinet.
Figure 3:
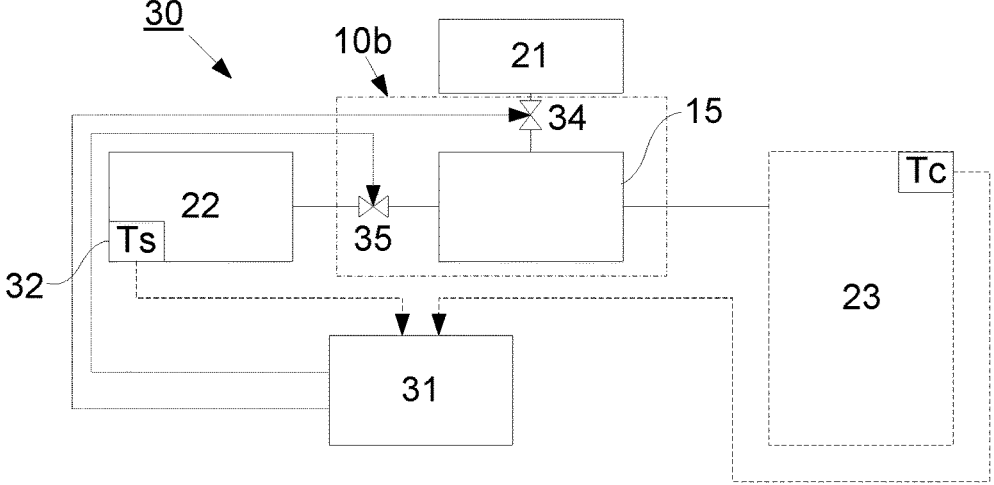
FIG. 3 illustrates a second embodiment of a system for feeding smoke particles to a smoke cabinet including a control unit.

FIGS. 2 and 3 illustrate two different implementations of the smoke generator in a system for feeding smoke particles to a smoke cabinet.

FIG. 2 illustrates a first embodiment of a system 20 for feeding smoke particles to a smoke cabinet 23, wherein the system comprising a smoke generator 10a (as described above and indicated by a dash-dotted line), a steam supply 22 and a smoke condensate supply 21. The steam supply 22 provides overheated water steam to a steam inlet 12 of the smoke generator 10a via a pressure regulator 25, and the smoke condensate supply 21 provides smoke condensate to a condensate inlet 11 of the smoke generator 10a via a condensate regulator 24. Smoke particles from a smoke outlet 13 of the smoke generator is provided to an inlet 26 of the smoke cabinet 23.

In this embodiment, the smoke generator comprises a nozzle 14 attached to the condensate inlet 11, which nozzle 14 is configured to distribute the smoke condensate within the housing 15 of the smoke generator. Furthermore, the smoke generator 10a is, in this embodiment, provided with a manually controlled smoke condensate regulator 24 regulating a flow rate of the smoke condensate through the condensate inlet 11 into the housing 15 of the smoke generator 10a. The flow rate is preferably in the range of 0.1 to 20 liters/hour.

In addition, the smoke generator 10a is, in this embodiment, provided with a manually controlled pressure regulator 25 regulating a pressure of the overheated water steam entering through the steam inlet 12 into the housing 15 of the smoke generator 10a. The pressure is preferably in the range of 0.2 to 1.2 bar. The smoke cabinet 23 is in this embodiment not a part of the system 20, and it is therefore illustrated by dashed lines.

Inside the housing 15, the condensate inlet 11, or more precisely the nozzle 14, is located between the steam inlet 12 and the smoke outlet 13. The distance from the nozzle 14 to the smoke outlet 13 is at least 100 mm, preferably at least 200 mm, or even more preferred at least 400 mm. Thereby, with application of the pressures and flow rates mentioned hereinabove for the condensate and steam, the distance between nozzle 14 and smoke outlet 13 will guarantee that small-sized smoke particles will be generated before the condensate reaches an inner wall of the housing 15 in which the smoke outlet is located. The distance between the nozzle 14 and the wall or walls of the housing 15 surrounding the nozzle 14 and extending between the steam inlet 13 to the smoke outlet 14 is at least 20 mm, preferably at least 50 mm, or even more preferred at least 100 mm. Thereby, with application of the pressures and flow rates mentioned hereinabove for the condensate and the steam, the distance between nozzle 14 and surrounding walls of the housing 15 will prevent condensate from reaching and clogging on the surface of the walls to a substantial degree.

The mixed steam and liquid (sum of condensate and steam) flow rate through the housing 15 is in the range of 25-300 kg/hour.

FIG. 3 illustrates a second embodiment of a system 30 for feeding smoke particles to a smoke cabinet including a control unit 31 wherein the system comprising a smoke generator 10b (as described above and indicated by a dash-dotted line), a steam supply 22, a smoke condensate supply 21 and the control unit 31. The steam supply 22 provides overheated water steam to a steam inlet 12 of the smoke generator 10b via a pressure regulator 35, and the smoke condensate supply 21 provides smoke condensate to a condensate inlet 11 of the smoke generator 10b via a condensate regulator 34. Smoke particles from a smoke outlet 13 of the smoke generator is configured to be provided to an inlet 26 of the smoke cabinet 23.

In this embodiment, the overheated water steam has a sensor 32 to measure a steam temperature, Ts, and the smoke cabinet is configured to be operating at a cabinet temperature, Tc, wherein the control unit 31 is configured to control the conversion of the smoke condensate to smoke particles based on the steam temperature, Ts, and the cabinet temperature, Tc. In order to achieve this, the smoke generator 10b is provided with an automatically controlled smoke condensate regulator 34 regulating a flow rate of the smoke condensate through the condensate inlet 11 into the housing 15, and an automatically controlled pressure regulator 35 regulating a pressure of the overheated water steam entering through the steam inlet 12 into the housing 15 of the smoke generator 10b.

The flow rate is preferably in the range of 0.1 to 20 liters/hour and the pressure is preferably in the range of 0.2 to 1.2 bar. The smoke cabinet 23 is not a part of the system 30, and it is therefore illustrated by dashed lines The present disclosure relates to a smoke generator comprising a housing with a condensate inlet for receiving a smoke condensate and a steam inlet for receiving overheated water steam, wherein the smoke condensate is converted to smoke particles when the smoke condensate interacts with the overheated water steam, and the smoke particles are accessible at a smoke outlet.

According to some embodiments, the overheated water steam has a temperature of 120 degrees Celsius.

According to some embodiments, the smoke generator further comprises a nozzle attached to the condensate inlet configured to distribute the smoke condensate within the housing.

According to some embodiments, the smoke generator is provided with a smoke condensate regulator regulating a flow rate of the smoke condensate through the condensate inlet into the housing of the smoke generator. The flow rate may be in the range of 0.1 to 20 liters/hour.

According to some embodiments, the smoke generator is provided with a pressure regulator regulating a pressure of the overheated water steam entering through the steam inlet into the housing of the smoke generator. The pressure may be in the range of 0.2 to 1.2 bar.

The present disclosure also relates to a system for feeding smoke particles to a smoke cabinet, the system comprising a smoke generator as defined above, a steam supply and a smoke condensate supply, wherein the steam supply provides overheated water steam to the steam inlet of the smoke generator via a pressure regulator. The smoke condensate supply provides smoke condensate to the condensate inlet of the smoke generator via a condensate regulator, and smoke particles from the smoke outlet of the smoke generator are configured to be provided to an inlet of the smoke cabinet. The smoke cabinet can be a cabinet where products are being exposed while being stationary as well as a continues system where the product is in motion momentarily or in cyclic steps using a belt, conveyer or any other forms of movement. The cabinet itself can have openings that don't close since continues system have this feature.

According to some embodiments, the overheated water steam has a sensor to measure a steam temperature, Ts, and the smoke cabinet is configured to be operating at a cabinet temperature, Tc, wherein the system further comprises a control unit configured to control the conversion of the smoke condensate to smoke particles based on the steam temperature, Ts, and the cabinet temperature, Tc. It should be noted that the smoke particles may be natural sized smoke particles, e.g. non-visible smoke particles having a size less than 7 micrometers.

According to some embodiments, the control unit is further configured to control the condensate regulator to regulate the flow rate of the smoke condensate and/or the pressure regulator to regulate the pressure of the overheated water steam to control the conversion of the smoke condensate to smoke particles, which may be natural sized smoke particles.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A system for feeding smoke particles to a smoke cabinet, the system comprising:
a smoke generator comprising a housing with a condensate inlet for receiving a smoke condensate and a steam inlet for receiving overheated water steam,
wherein the smoke condensate is converted to smoke particles when the smoke condensate interacts with the overheated water steam, and the smoke particles are accessible at a smoke outlet,
wherein the smoke generator is provided with a smoke condensate regulator regulating a flow rate of the smoke condensate through the condensate inlet into the housing of the smoke generator, and
wherein the smoke generator is provided with a pressure regulator regulating a pressure of the overheated water steam entering through the steam inlet into the housing of the smoke generator,
a steam supply,
a smoke condensate supply,
wherein the steam supply provides overheated water steam to the steam inlet of the smoke generator via the pressure regulator, the smoke condensate supply provides smoke condensate to the condensate inlet of the smoke generator via the condensate regulator, and smoke particles from the smoke outlet of the smoke generator are configured to be provided to an inlet of the smoke cabinet,
a sensor configured to measure a steam temperature, $T_s$, and the smoke cabinet is configured to be operating at a cabinet temperature, $T_c$, and
a control unit configured to control the conversion of the smoke condensate to smoke particles based on the steam temperature, $T_s$, and the cabinet temperature, $T_c$, and
wherein the control unit is further configured to control the condensate regulator to regulate the flow rate of the smoke condensate and/or the pressure regulator to regulate the pressure of the overheated water steam to control the conversion of the smoke condensate to smoke particles such that the size of the smoke particles generated by the smoke generator is smaller than 10 micrometers.

2. The system according to claim 1, wherein the system is configured to generate a mixed steam and a liquid flow rate through the housing in the range of 25-300 kg/hour.

3. The system according to claim 1, wherein the overheated water steam has a temperature of 120 degrees Celsius.

4. The system according to any of claim 1, further comprising a nozzle attached to the condensate inlet configured to distribute the smoke condensate within the housing.

5. The system according to claim 4, wherein the nozzle is located between the steam inlet and the smoke outlet and wherein a distance from the nozzle to the smoke outlet is at least 100 mm.

6. The system according to claim 4, wherein a distance between the nozzle and the wall or walls of the housing surrounding the nozzle and extending between the steam inlet to the smoke outlet is at least 20 mm.

7. The system according to claim 1, wherein the flow rate is in the range of 0.1 to 20 liters/hour.

8. The system according to claim 1, wherein the pressure is in the range of 0.2 to 1.2 bar.

* * * * *